United States Patent [19]
Haboush

[11] Patent Number: 5,520,215
[45] Date of Patent: May 28, 1996

[54] PRESSURE REGULATOR AND DAMPENER ASSEMBLY

[75] Inventor: William Haboush, Pontiac, Mich.

[73] Assignee: Handy & Harman Automotive Group, Inc., Auburn Hills, Mich.

[21] Appl. No.: 511,236

[22] Filed: Aug. 4, 1995

[51] Int. Cl.⁶ .................................................. G05D 16/02
[52] U.S. Cl. ........................... 137/510; 123/463; 123/467; 251/48
[58] Field of Search .................... 137/494, 510; 123/447, 463, 467; 251/48, 50

[56] References Cited

U.S. PATENT DOCUMENTS

| | | | |
|---|---|---|---|
| 1,676,889 | 7/1928 | Davis | 137/510 |
| 2,146,092 | 2/1939 | Raymond | 137/510 |
| 2,986,881 | 6/1961 | Moore | 123/447 X |
| 3,123,094 | 3/1964 | Toschkoff | 251/50 X |
| 4,203,467 | 5/1980 | Cardi | 137/510 X |
| 4,265,274 | 5/1981 | Zahid | 138/30 |
| 4,427,174 | 1/1984 | Mehoudar | 137/494 X |
| 4,615,320 | 10/1986 | Fehrenbach et al. | 123/467 |
| 4,633,901 | 1/1987 | Brandt et al. | 137/510 |
| 4,679,537 | 7/1987 | Fehrenbach et al. | 123/447 |
| 4,825,835 | 5/1989 | Deweerdt | 137/510 X |
| 4,903,721 | 2/1990 | Maier | 123/463 X |
| 5,076,320 | 12/1991 | Robinson | 137/510 X |
| 5,163,468 | 11/1992 | Robinson et al. | 137/510 X |
| 5,213,126 | 5/1993 | Ono et al. | 137/510 X |
| 5,275,203 | 1/1994 | Robinson | 137/510 |
| 5,279,327 | 1/1994 | Alsobrooks et al. | 137/510 |
| 5,361,800 | 11/1994 | Ewing | 137/510 |

*Primary Examiner*—Stephen M. Hepperle
*Attorney, Agent, or Firm*—Pennie & Edmonds

[57] ABSTRACT

The present invention relates to a pressure regulator and dampener assembly which can regulate the liquid pressure and, at the same time, absorb liquid pressure pulse waves in a liquid system. The pressure regulator and dampener assembly comprises a housing and diaphragm means dividing the housing into a control chamber, a liquid chamber adjacent to the control chamber and a dampening chamber adjacent to the liquid chamber. An inlet and an outlet are used by which liquid enters and exits the liquid chamber. A valve means is mounted on the diaphragm means for controlling liquid exiting the liquid chamber. The assembly further comprises an adjusting means for controlling the valve means to move between a closed position and an open position.

18 Claims, 3 Drawing Sheets

5,520,215

PRESSURE REGULATOR AND DAMPENER ASSEMBLY

FIELD OF THE INVENTION

The present invention relates to a pressure regulator and dampener assembly, and more particularly to a liquid pressure regulator and dampener assembly which can regulate the liquid pressure. This assembly can also absorb liquid pressure pulse waves in a liquid system utilized in the process of regulating liquid pressure or in the operation of liquid injectors or pumps.

BACKGROUND OF THE INVENTION

Pressure regulators are commonly used to maintain a preselected pressure within liquid systems. As disclosed in U.S. Pat. Nos. 5,076,320, 4,825,835 and 4,633,901, a typical pressure regulator usually comprises a housing which can be divided into a control chamber and a liquid chamber by a diaphragm assembly. A liquid introduction path and a liquid discharge path communicate with the liquid chamber, by which liquid can enter and exit the liquid chamber. The diaphragm assembly has a valve member to control the exit of excess liquid from the liquid chamber. A vacuum port communicates between the control chamber and a vacuum system for adjusting the valve member. However, such a pressure regulator lacks the ability of dampening wave pulses in a liquid system. Any wave pulse generated by cyclically operated injectors or pumps will remain in the liquid system and can affect the performance of the pressure regulator and other parts in the liquid system.

Dampeners are usually used in liquid systems to dampen pressure fluctuations caused either by pressure pulses in injection valves or by liquid feed pumps. As disclosed in U.S. Pat. Nos. 4,679,537 and 4,265,274, a typical dampener comprises a housing divided into a liquid chamber and a dampening chamber by a diaphragm assembly. The dampening chamber can either absorb excess pressure or compensate insufficient pressure in the liquid chamber due to pressure fluctuations. However, such a dampener lacks the necessary mechanism to maintain a predetermined pressure within the liquid system, and therefore is limited to the application where a liquid pressure is maintained by other system components.

It is desirable to provide a pressure regulator and dampener assembly, and particularly a liquid pressure regulator and dampener assembly to regulate liquid pressure while at the same time, absorbing liquid pressure pulse waves in a liquid system. The present invention provides an assembly which meets these requirements.

SUMMARY OF THE INVENTION

The pressure regulator and dampener assembly of the present invention comprises a housing and diaphragm means which divides the housing into a control chamber, a liquid chamber adjacent to the control chamber and a dampening chamber adjacent to the liquid chamber. An inlet and an outlet are provided by which liquid enters and exits the liquid chamber. A valve means is mounted on the diaphragm means for controlling liquid exiting the liquid chamber. The pressure regulator and dampener assembly further comprises an adjusting means for controlling the movement of the valve means to move between closed and open positions. The valve means moves to the open position to discharge excess liquid when the pressure in the liquid chamber exceeds the pressure in the control chamber; and the dampening chamber absorbs liquid pressure pulse waves by fluctuation of the diaphragm means.

The diaphragm means preferably comprises a first diaphragm and a second diaphragm. The first diaphragm is a pressure regulator diaphragm which separates the control chamber and the liquid chamber. The second diaphragm is a pulse dampener diaphragm which separates the liquid chamber and the dampening chamber.

The valve means in the pressure regulator and dampener assembly of the present invention is mounted on the first diaphragm and adapted to engage with the inner end of the outlet for closing the outlet. The valve means can comprise a spherical sealing means to engage with the inner end of the outlet. The inner end of the outlet can be a spherical cavity for receiving the spherical sealing means.

In the pressure regulator and dampener assembly of the present invention, the inlet may be an inlet conduit and the outlet may be an outlet conduit. The inlet and outlet conduits can extend into or through the dampening chamber, preferably with each having an inner end thereof extended into the dampening chamber.

The adjusting means in the pressure regulator and dampener assembly of the present invention preferably is a spring for biasing the pressure regulator diaphragm and the valve means against the inner end of the outlet to prevent liquid from exiting the liquid chamber. The adjusting means maintains the valve means in the closed position until forces caused by buildup of liquid in the liquid chamber causes the valve means to move towards the open position to allow liquid to exit the liquid chamber.

The dampening chamber can be an air chamber to absorb pressure pulse waves. The air chamber can contain a sufficient amount of air sealed inside the chamber at the time of manufacture. Alternatively, high viscosity liquids can be used to fill the dampening chamber, or a second spring can be used for biasing the pulse dampener diaphragm.

The pressure regulator and dampener assembly of the present invention further comprises a vacuum port mounted on the control chamber by which a vacuum is communicated to the control chamber. In addition, the assembly can be mounted to other parts in the liquid system through a supporting plate.

The pressure regulator and dampener assembly constructed according to the present invention can thus regulate the liquid pressure and, at the same time, absorb liquid pressure pulse waves in a liquid system.

DETAILED DESCRIPTION OF THE PREFERRED EMBODIMENTS

Figure 1:
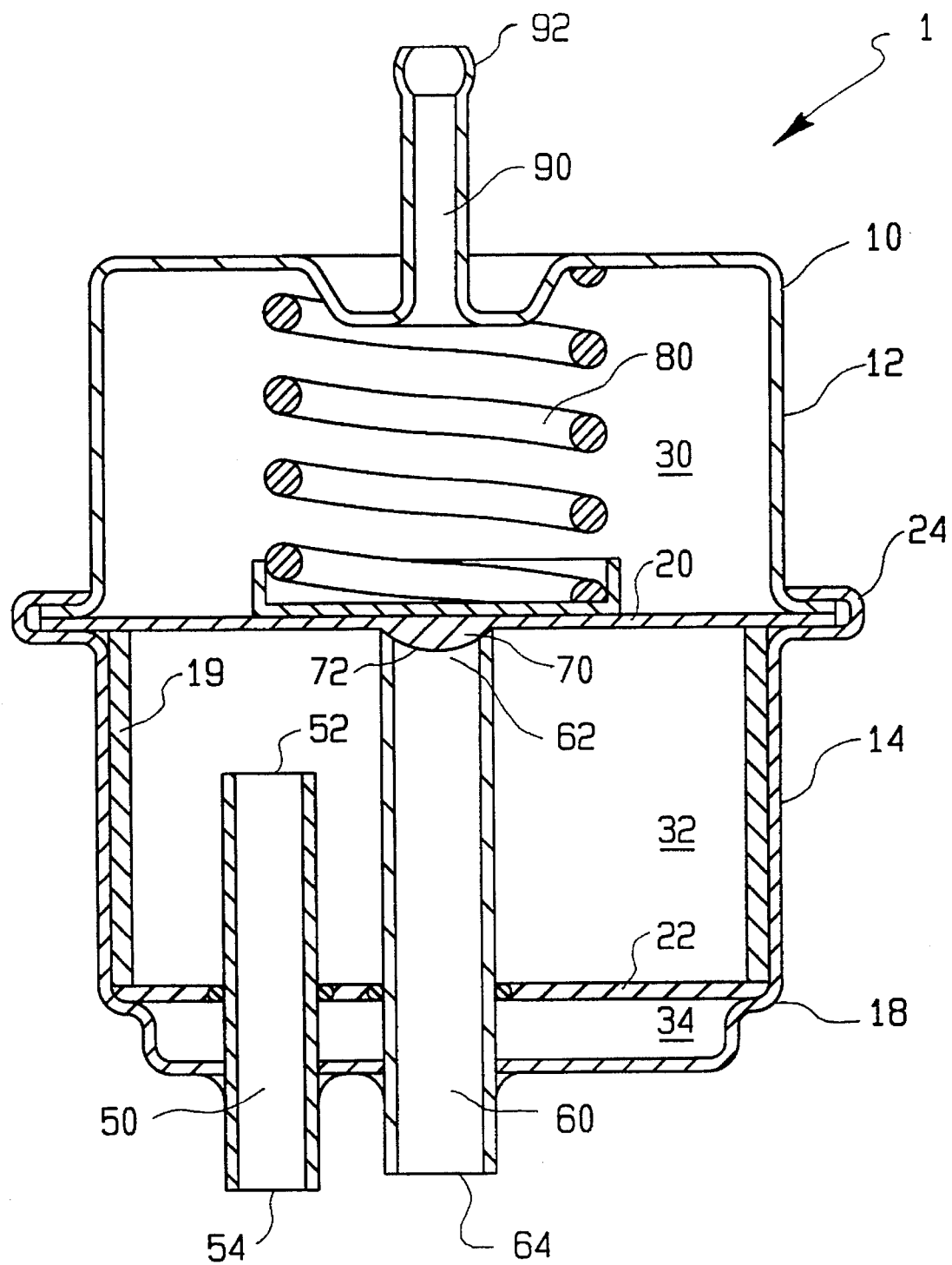
FIG. 1 is a longitudinal cross-section of a pressure regulator and dampener assembly according to the present invention, in which the valve means is shown in a closed position.
Figure 2:
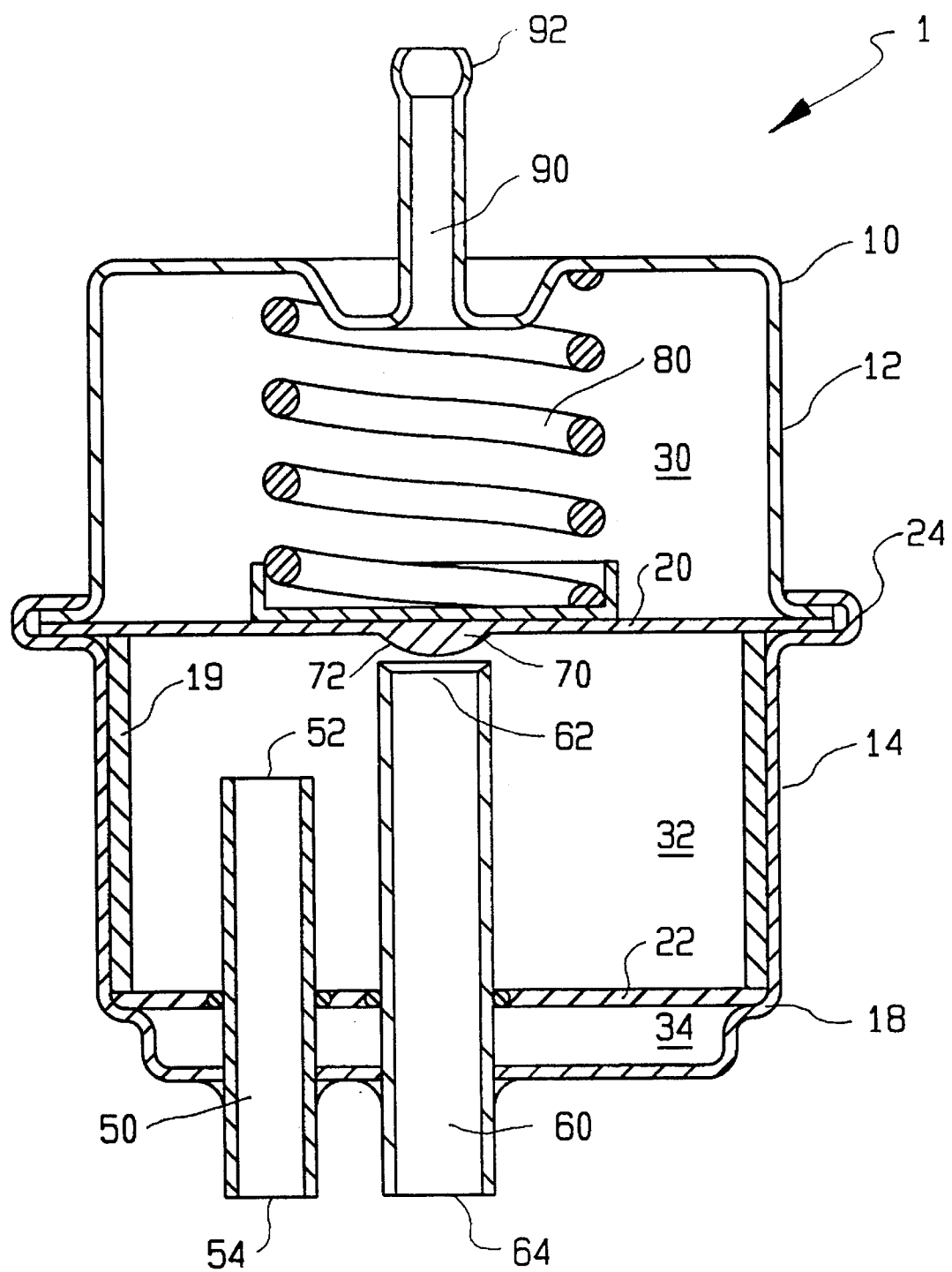
FIG. 2 is the same to FIG. 1 except that the valve means is shown in an open position.

A pressure regulator and dampener assembly 1 embodying the principles of the present invention is illustrated in FIGS. 1 and 2. The pressure regulator and dampener assembly 1 of the present invention can be connected in a liquid line through its inlet and outlet conduits 50 and 60. Such a pressure regulator and dampener assembly 1 can both regulate the liquid pressure and absorb liquid pulse waves in a liquid system, and therefore is an advantage over both conventional pressure regulators and conventional dampeners. Further, the pressure regulator and dampener assembly 1 of the present invention has a compact structure.

Referring to FIG. 1, the pressure regulator and dampener assembly 1 comprises a housing 10, which has a circular cylindrical shape. The housing 10 is formed by joining together a plurality of segments. These segments are connected through any conventional means used in forming a cylindrical housing. Typically, each of the segments has an outwardly extending lateral annular flange on its open end. The lateral annular flanges of two adjacent segments can be joined together through conventional means, such as stamping.

Figure 3:
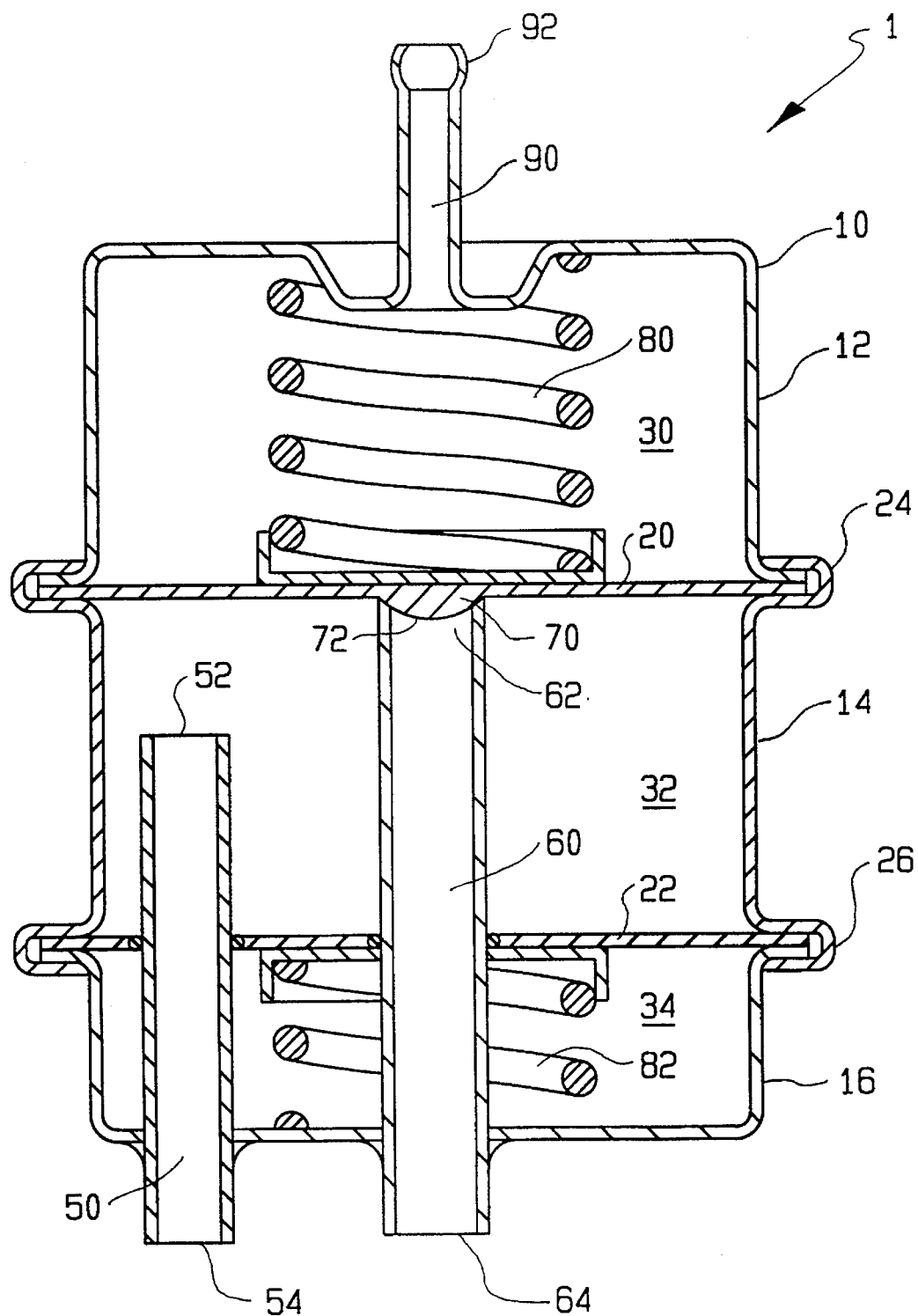
FIG. 3 is a longitudinal cross-section of another embodiment of the present invention, in which a second spring is used in the dampening chamber.

In the preferred embodiment of the present invention, a first metal segment 12 and a second metal segment 14 are joined together to form the housing 10. Both segments 12 and 14 have a cylindrical shape. The segments 12 and 14 are stamped together at their overlapped flange region to form a joint 24. The joint 24 is an annular joint surrounding the cylindrical housing 10. The radially outer margin of a first diaphragm 20 is further clamped by the joint 24 across the interior of the housing 10. The second segment 14 comprises a stepped portion 18 for connecting with the second diaphragm 22. A retainer 19 is provided to keep the second diaphragm 22 in its position after the pressure regulator and dampener assembly 1 is assembled. Such stepped portion 18 helps to eliminate a joint in connecting the second segment 14 and second diaphragm 22. Alternatively, as shown in FIG. 3, the second segment 14 can be joined to a third segment 16 in the same manner as the first and second segments 12 and 14.

The interior of the housing 10 is divided into a control chamber 30, a liquid chamber 32 adjacent to the control chamber 30 and a dampening chamber 34 adjacent to the liquid chamber 32. The chambers 30, 32 and 34 are separated by diaphragm means 20 and 22. The control chamber 30 and the liquid chamber 32 are separated by the first diaphragm 20. The liquid chamber 32 and the dampener chamber 34 are separated by the second diaphragm 22. The liquid chamber 32 is arranged between the control chamber 30 and the dampening chamber 34. Such an arrangement is advantageous in reducing any interference between the operation of the control chamber 30 and the dampening chamber 34.

In a preferred embodiment, the control chamber 30 is defined by the first segment 12 and the first diaphragm 20. The liquid chamber 32 is defined by the upper part of the second segment 14 and the first and second diaphragms 20 and 22. The dampening chamber 34 is defined by the lower part of the second segment 14 and the second diaphragm 22.

The first diaphragm 20 is a pressure regulator diaphragm and the second diaphragm 22 is a pulse dampener diaphragm. The pressure regulator diaphragm 20 and the pulse dampener diaphragm 22 are preferably made of a hydrophobic material which is highly flexible but has limited stretchability. In a preferred embodiment, the pressure regulator diaphragm 20 and the pulse dampener diaphragm 22 can be made of a thermoplastic polymer, rubber, an elastomer, or similar other equivalent materials. The pressure regulator diaphragm 20 has a valve means 70 mounted thereon as discussed below.

An inlet is provided by which liquid can enter the liquid chamber 32. The inlet is defined by an inlet conduit 50. The inlet conduit 50 passes through the dampening chamber 34 and the pulse dampener diaphragm 22 until its inner end 52 enters the liquid chamber 32. The inlet conduit 50 is sealed to the pulse dampener diaphragm 22 by conventional means, and is fixed to the housing 10 by welding. The outer end 54 of the inlet conduit 50 is adapted to connect with the upflow end of a fluid line (not shown).

An outlet is provided by which excess liquid can exit the liquid chamber 32. The outlet is defined by an outlet conduit 60. The outlet conduit 60 is fixed to the housing 10 and passes through the dampening chamber 34 and the pulse dampener diaphragm 22 in the same way as the inlet conduit 50. The inner end 62 of the outlet conduit 60 is disposed inside the liquid chamber 32 and includes a valve seat adapted to engage with the valve means 70 for selectively blocking the outlet conduit 60. In the preferred embodiment, the inner end 62 the outlet conduit 60 is in the form of a semi-spherical cavity to define a sealing means 72 which is complementary in shape to the shape of the valve means 70. The outlet 60 has an outer end adapted to connect with the downflow end of a fluid line.

The valve means 70, which is mounted on the first diaphragm 20, controls the flow of liquid exiting from the liquid chamber 32. The valve means 70 is adapted to engage with the inner end 62 of the outlet 60 for closing the outlet 60. The valve means 70 can comprise a spherical sealing means 72 to engage with the spherical cavity at the inner end 62 of the outlet 60. The spherical sealing means 72 and the spherical cavity on inner end 62 preferably have the same curvature for a better sealing effect. In the preferred embodiment, the valve means is a ball needle while the cavity 72 is a ball seat. The ball needle disposed on the first diaphragm 20 engages with the ball seat on the inner end 62 of the outlet conduit 60.

An adjusting means, in the form of a compression spring 80, is disposed in the control chamber 30 for controlling the movement of the valve means 70 between a closed position (FIG. 1) and an open position (FIG. 2). The spring acts in opposition to the pressure in the liquid chamber 32 and biases the valve means 70 against the sealing means 72 of the outlet conduit 60 so that the outlet conduit 60 is closed and cut off from the liquid chamber 32. The compression spring 80 has a referenced wire diameter and pre-set length depending on the pressure set of the assembly.

A vacuum port 90 is connected to the pressure regulator and dampener assembly 1 and communicates with the control chamber 30. The distal end 92 of the vacuum port 90 is adapted to connect with a conduit (not shown) by which a vacuum source, such as an engine intake manifold vacuum is conveyed to the pressure regulator and dampener assembly 1. The compressing spring 80 and the vacuum in the control chamber 30 act in consent to control the level of the pressure in the liquid chamber 32 required before the ball needle unseats itself from the ball seat.

The dampening chamber 34 is an air chamber for dampening pressure pulse waves in the liquid system. The dampening chamber 34 is made air-tight containing a sufficient amount of air at the time of manufacture. A fluid 84, such as a high viscosity liquid, can also be used to fill the dampening chamber 34. Such high viscosity liquid is also sealed inside the dampening chamber 34 at the time of manufacture. Alternatively, the dampening chamber 34 can comprise a compression spring 82 biasing the pulse dampening diaphragm 22.

Under normal operation circumstances, the compression spring 80 will bias the pressure regulator diaphragm 20 and the valve means 70 against the inner end 62 of the outlet 60 to keep the pressure regulator and dampener assembly 1 in a closed position as shown in FIG. 1. In this case, the outlet 60 is closed and cut off from the liquid chamber 32.

As liquid is being accumulated in the liquid chamber 32, the liquid pressure will build up in the liquid chamber 32. When the liquid pressure exceeds the preset pressure in the control chamber 30, the compression spring 80 will compress and the valve means 70 will be raised off of the inner end 62 of the outlet 60. The outlet 60 is thus open at its inner end 62 to communicate with the liquid chamber 32. Therefore, excess liquid will exit the liquid chamber 32 by the outlet 60 to reduce the pressure in the liquid chamber 32.

As excess liquid is discharged from the liquid chamber 32, the liquid pressure in the liquid chamber 32 is reduced. Once the liquid pressure in the liquid chamber 32 drops to preset pressure, the spring 80 will force the pressure regulator diaphragm 20 and the valve means 70 against the inner end 62 on the outlet 60.

The dampening chamber 34 absorbs liquid pressure pulse waves in the liquid system caused in the process of regulating liquid pressure or in the operation of liquid injectors or pumps. More, specifically, the pulse dampener diaphragm 22 fluctuates to dampen the pulse waves. Upon the occurrence of pressures in the liquid chamber 32 in excess of pressure in the dampening chamber 34, the pulse dampener diaphragm 22 is forced toward the dampening chamber 34 to storage the energy inside the dampening chamber 34. When the liquid pressure falls below the pressure in the dampening chamber 34, the stored energy forces the pulse dampener diaphragm 22 toward the liquid chamber 32 to return to its original position.

As noted above, the pressure in the dampening chamber 34 can be achieved by entrapped air pressure, a fluid or liquid, or by a second spring 82 (shown in FIG. 3) which operates in the same manner as spring 80.

What is claimed is:

1. A pressure regulator and dampener assembly comprising:
   a housing;
   diaphragm means dividing said housing into a control chamber, a liquid chamber adjacent to said control chamber and a dampening chamber adjacent to said liquid chamber;
   an inlet by which liquid enters said liquid chamber;
   an outlet by which liquid exits said liquid chamber, said outlet having an inner end in said liquid chamber;
   valve means mounted on said diaphragm means and moveable between open and closed positions for controlling the amount of liquid exiting said liquid chamber; and
   adjusting means for urging said valve means towards said closed position,
   wherein said valve means moves to said open position to discharge excess liquid when the pressure in said liquid chamber exceeds the pressure in said control chamber; and said dampening chamber absorbs liquid pressure pulse waves by fluctuation of said diaphragm means.

2. The assembly of claim 1 wherein said diaphragm means comprises a first diaphragm and a second diaphragm, said first diaphragm separating said control chamber and said liquid chamber, said second diaphragm separating said liquid chamber and said dampening chamber.

3. The assembly of claim 2 wherein said valve means is mounted on said first diaphragm, said valve means being adapted to engage with said inner end of said outlet for blocking said outlet.

4. The assembly of claim 3 wherein said valve means comprises spherical sealing means, said inner end of said outlet being a spherical cavity for receiving said spherical sealing means.

5. The assembly of claim 2 wherein said adjusting means comprises spring means for biasing said valve means against said inner end of said outlet to prevent liquid from exiting said liquid chamber.

6. The assembly of claim 2 wherein said inlet is an inlet conduit and said outlet is an outlet conduit, said inlet conduit and said outlet conduit extending through said dampening chamber.

7. The assembly of claim 2 further comprising a vacuum port operationally associated with said control chamber by which a vacuum is communicated to said control chamber.

8. The assembly of claim 2 wherein said dampening chamber is an air-tight chamber.

9. The assembly of claim 8 wherein said dampening chamber is filled with air.

10. The assembly of claim 8 wherein said dampening chamber is filled with a liquid.

11. The assembly of claim 2 wherein one or both of the diaphragm means comprises a thermoplastic polymer, rubber or an elastomer.

12. A pressure regulator and dampener assembly comprising:
    a housing including a control chamber, a liquid chamber and a dampening chamber;
    first diaphragm means positioned between said control chamber and said liquid chamber;
    second diaphragm means positioned between said liquid chamber and said dampening chamber;
    an inlet by which liquid enters said liquid chamber;
    an outlet by which excess liquid exits said liquid chamber;
    valve means mounted on said first diaphragm, moveable between open and closed positions, and operatively associated with said outlet for preventing liquid from exiting said liquid chamber; and
    adjusting means for urging said valve means towards said closed position,
    wherein said adjusting means maintains said valve means in said closed position until forces caused by buildup of liquid in said liquid chamber causes said valve means to move towards said open position to allow liquid to exit said liquid chamber; and said dampening chamber absorbs liquid pressure pulse waves by fluctuation of said second diaphragm means.

13. The assembly of claim 12 wherein said dampening chamber is filled with air or a fluid.

14. The assembly of claim 12 wherein said adjusting means comprises first spring means located in said control chamber for biasing said valve means against said outlet.

15. The assembly of claim 14 wherein said dampening chamber includes second spring means for supporting said second diaphragm means.

16. The assembly of claim 15 wherein the force provided by said second spring means is less than that provided by the first spring means.

17. The assembly of claim 15 wherein each diaphragm means comprises a thermoplastic polymer, rubber or an elastomer.

18. The assembly of claim 12 further comprises a vacuum port operatively associated with said control chamber for introducing a vacuum therein to cause said valve means to move toward said open position and allow liquid to exit said liquid chamber.

* * * * *